United States Patent
Bachtle (10) Patent No.: US 7,381,123 B2
(45) Date of Patent: Jun. 3, 2008

(54) APPARATUS AND METHOD FOR DIVIDING A STUFFED SAUSAGE SKEIN

(75) Inventor: Manfred Bachtle, Schemmerhofen (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 0 days.

(21) Appl. No.: 11/901,617

(22) Filed: Sep. 18, 2007

(65) Prior Publication Data

US 2008/0070489 A1 Mar. 20, 2008

(51) Int. Cl.
*A22C 11/00* (2006.01)

(52) U.S. Cl. ...................................... 452/46

(58) Field of Classification Search ........... 452/30–32, 452/35–37, 46–48, 51

See application file for complete search history.

(56) References Cited

U.S. PATENT DOCUMENTS

| | | | |
|---|---|---|---|
| 3,115,668 A | | 12/1963 | Townsend |
| 4,730,367 A | * | 3/1988 | Vinokur ..................... 452/32 |
| 5,133,685 A | * | 7/1992 | Stohr ......................... 452/48 |
| 5,145,450 A | * | 9/1992 | Staudenrausch et al. ...... 452/47 |
| 5,145,451 A | | 9/1992 | Staudenrausch |
| 5,788,563 A | * | 8/1998 | Nakamura et al. ............ 452/47 |
| 6,050,888 A | | 4/2000 | Nakamura et al. |
| 6,439,990 B1 | * | 8/2002 | Kasai et al. .................. 452/46 |
| 6,482,079 B1 | * | 11/2002 | Nakamura et al. ............ 452/47 |
| 6,494,311 B2 | * | 12/2002 | Muller ....................... 198/607 |

FOREIGN PATENT DOCUMENTS

| | | |
|---|---|---|
| DE | 9012339 | 8/1990 |
| EP | 0472825 | 3/1992 |
| EP | 0931458 | 7/1999 |
| EP | 1430779 | 6/2004 |

\* cited by examiner

*Primary Examiner*—Thomas Price
(74) *Attorney, Agent, or Firm*—Marshall, Gerstein & Borun LLP (57) ABSTRACT

An apparatus and a method for dividing a stuffed sausage skein, wherein a transport element pair is provided, including rotating opposite transport elements between which the stuffed sausage skein is conveyed in a transport direction and each of which include at least one dividing element. To be able to configure the length of the portions flexibly without mechanical adaptation, the apparatus comprises several adjacently arranged transport element pairs drivable independently of each other with corresponding dividing element pairs. The speed of the transport element pairs is adjusted such that the spacing between the points of separation corresponds to a predetermined length of the divided sausage skein.

12 Claims, 8 Drawing Sheets

APPARATUS AND METHOD FOR DIVIDING A STUFFED SAUSAGE SKEIN

CROSS-REFERENCE TO RELATED APPLICATION

The present application claims the benefit of priority of European Patent Application No. 06019555.9 filed Sep. 19, 2006. The entire text of the priority application is incorporated herein by reference in its entirety.

FIELD OF THE DISCLOSURE

The present disclosure relates to an apparatus and a method for dividing a stuffed sausage skein such as used in sausage-making operations.

BACKGROUND OF THE DISCLOSURE

Such an apparatus is already known from U.S. Pat. No. 6,050,888.

In the production of sausages, a difference is made between systems for stuffing sausage skeins in a portioned or a constant manner. With the portioning systems, a previously defined volume is discharged from the stuffing pipe of a stuffing machine into a sausage skin. Then, the portion is sealed, for example, by rotating the skin, whereafter the next portion is discharged. Such systems only allow low portioning performances.

With systems for stuffing constant sausage skeins, the product discharge is not stopped during the dividing process. The division of the skein into individual portions is accomplished by constriction with dividing elements. If the skein is thereby additionally subjected to a torsional prestress, a so-called twist at these points can be produced simultaneously by means of twisting. With these systems higher performances are achieved.

There are basically two possibilities for dividing the stuffed sausage skeins.

On the one hand, the continuously stuffed sausage skein can be divided by means of a rotating transport element, e.g. a chain or a toothed belt. To this end, dividing elements are provided at equal spacings on the periphery of the transport element. The dividing elements engage the stuffed sausage skein in pairs and constrict the same so as to produce a portion. The spacings of the dividing elements to each other and, thus, the changes of the sausage length cannot be varied during the production without modifying the system.

To produce other lengths, therefore, a new pair of chains is normally used. Thus, no flexibility with respect to the length of a product is possible. Moreover, the transport elements, i.e. the chain or the toothed belts on which the dividing elements are affixed, are normally subject to a non-variable pitch. Therefore, the exchange of the pair of chains does not allow the production of sausage lengths that do not fit into this pitch. Only those sausage lengths can be produced, that correspond to the integer pitch of the dividing elements. It had already been attempted in EP 1430779 to improve this lack of flexibility. It has already been described therein to fix the dividing elements detachably on the rotating transport elements and to mount them at other positions having a different pitch at the periphery of the transport element. However, since the transport element, that is, the belt or the chain itself, has a specific length, such an embodiment, too, only allows the production of sausage lengths the integer multiple of which corresponds to the length of the transport element. Example: A transport element having a circumference of 500 mm can comprise, for example, five dividing elements which have a constant spacing relative to each other. Thus, sausages having a sausage length of about 100 mm can be produced. With four dividing elements the length of the individual portions is 500 mm/4=125 mm. This means that the desired length can only be selected as a function of the circumference of the transport element. A sausage length of 110 mm is impossible, for example, with the above-described transport element. Moreover, if the operator does not want to exchange a complete set of transport elements for adapting the length, he must perform a mechanical re-equipment each time, which takes plenty of time during which he cannot produce with the system.

Another possibility for dividing the stuffed sausage skein is described, for example, in EP 0472825. Here, a conveyor belt is mounted in the direction of transport behind a flexible displacer pair. The speed of the displacer pair is variable during rotation, so that different lengths of sausages can be produced.

The disadvantage with that second type dividing structure is that the two required systems, that is, the displacer and the conveyor belt for producing products of equal length are mounted behind each other. Specifically, in the processing of a natural intestine problems may arise in the transfer of the first portion from the displacer into the conveyor belt because, due to the natural bend of the intestine, the sausage skein aims at deviating from the theoretical stuffing axis. Moreover, there is no engagement between the conveyor belts and the individual sausage portions in the direction of transport, so that the occurring slip may result in linear variations of the individual portions.

SUMMARY OF THE DISCLOSURE

Based on the foregoing, it is the object of the present disclosure to provide an apparatus and a method which eliminate, on the one hand, the drawbacks of the aforementioned systems and which allow to divide a stuffed sausage skein, wherein the length adjustment can be configured flexibly without mechanical adaptation, without the need to use two systems mounted one behind the other.

According to the present disclosure the apparatus comprises several adjacently arranged pairs of transport elements, which can be driven independently of each other, including corresponding pairs of dividing elements. Due to the fact that the speed of the pairs of transport elements can be adjusted independently of each other, the spacing between successive points of separation can be exactly adjusted by varying the speed, so that a specific length l of the divided sausage skein can be adjusted. Thus, it is possible to produce different product lengths without a modification to mechanical parts and without completely changing the set-up. The length of the divided sausage skein can thereby be configured flexibly and adjusted optionally. Moreover, there is no critical transition point between two systems mounted one behind the other. Further, the length of the divided sausage skein is not dependent on the length or the circumference, respectively, of the rotating transport element.

According to a preferred embodiment of the present disclosure the apparatus additionally comprises an independently drivable pair of transport elements, which is devoid of dividing elements and which is configured to guide and support the stuffed sausage skein, as well as a control device driving this pair of transport elements at a speed to make it run synchronously with respect to the discharge of the stuffing material and the conveying speed of the stuffed sausage skein, respectively. This additional pair of transport elements, which is preferably disposed in a central region of the transport elements, may thereby assume an additional supporting and guiding function for the products. This pair of transport elements can also cover greater distances than the other transport elements equipped with dividing elements. This system is specifically suited for the production of twisted off portions (e.g. in combination with twist-off and brake ring transmissions), because the supporting and guiding function of the pair of transport elements allows the secure holding of the stuffed sausage skein and its subjecting to torsional prestress. By the engagement of the dividing elements of the other pairs of transport elements then the position of the point of separation is defined.

According to another embodiment at least one pair of transport elements is formed of several spaced-apart pairs of subtransport elements, which are driven in the same manner, however. The different pairs of transport elements can then be arranged to fit into one another or to lie in one another, respectively. If the subtransport elements of the pairs of transport elements, which are placed side by side in a spaced-apart manner and have the same drive, are connected to each other by a respective connecting element, a corresponding dividing element can be mounted on the connecting element. Thus, the dividing element can be easily positioned exactly between the subtransport elements. The dividing elements are preferably arranged to lie substantially above the central axis M of the adjacent transport elements. This ensures that the rotating dividing elements or pairs of dividing elements, respectively, can exactly divide the stuffed sausage skein about the longitudinal axis L of the sausage skein without being laterally offset.

The dividing elements are preferably disposed on the transport elements to be rotatably mounted about an axis substantially perpendicularly to the transport direction T. This provides for the possibility to engage the dividing elements orthogonally to the product skein and to thereby produce, for example, shaped ends. The dividing elements are guided orthogonally to the stuffed skein or brought into this position, respectively, by a guide not explained in more detail.

According to the present disclosure a control device is provided, which controls the independent drives of the transport element pairs such that the sausage skein portions separated by successive pairs of dividing elements, which engage the sausage skein, have a predetermined length I.

The rotating transport elements of the pairs of transport elements may be disposed either opposite in parallel to each other or may also approach each other under a specific angle α in the transport direction T. By this, the dividing elements of the dividing element pairs can be engaged slowly, so that a soft production of the point of separation is possible.

Advantageously, as the pair of dividing elements engages the sausage skein, the corresponding pair of transport elements is driven at a speed to run synchronously with respect to the discharge of the stuffing material and the conveying speed of the stuffed sausage skein, respectively. This allows a continuous production and a continuous transport of the stuffed sausage skein, respectively.

According to a preferred embodiment of the method according to the disclosure two pairs of dividing elements mounted one behind the other are engaged directly one after the other with the stuffed sausage skein to be separated so as to produce the points of separation. Thus, a wider point of separation is produced. This effect is intensified if the two pairs move at different speeds during their engagement, that is, if the second pair of dividing elements runs more slowly than the first pair. By this, the point of separation is drawn apart, thereby resulting in an even greater gap between the portions. This is particularly advantageous if the point of separation is sealed, for example, with two adjacently arranged clips.

BRIEF DESCRIPTION OF THE DRAWINGS

The present disclosure will be explained in more detail below, with reference to the accompanying drawings.

DETAILED DESCRIPTION OF THE DISCLOSURE

Figure 1:
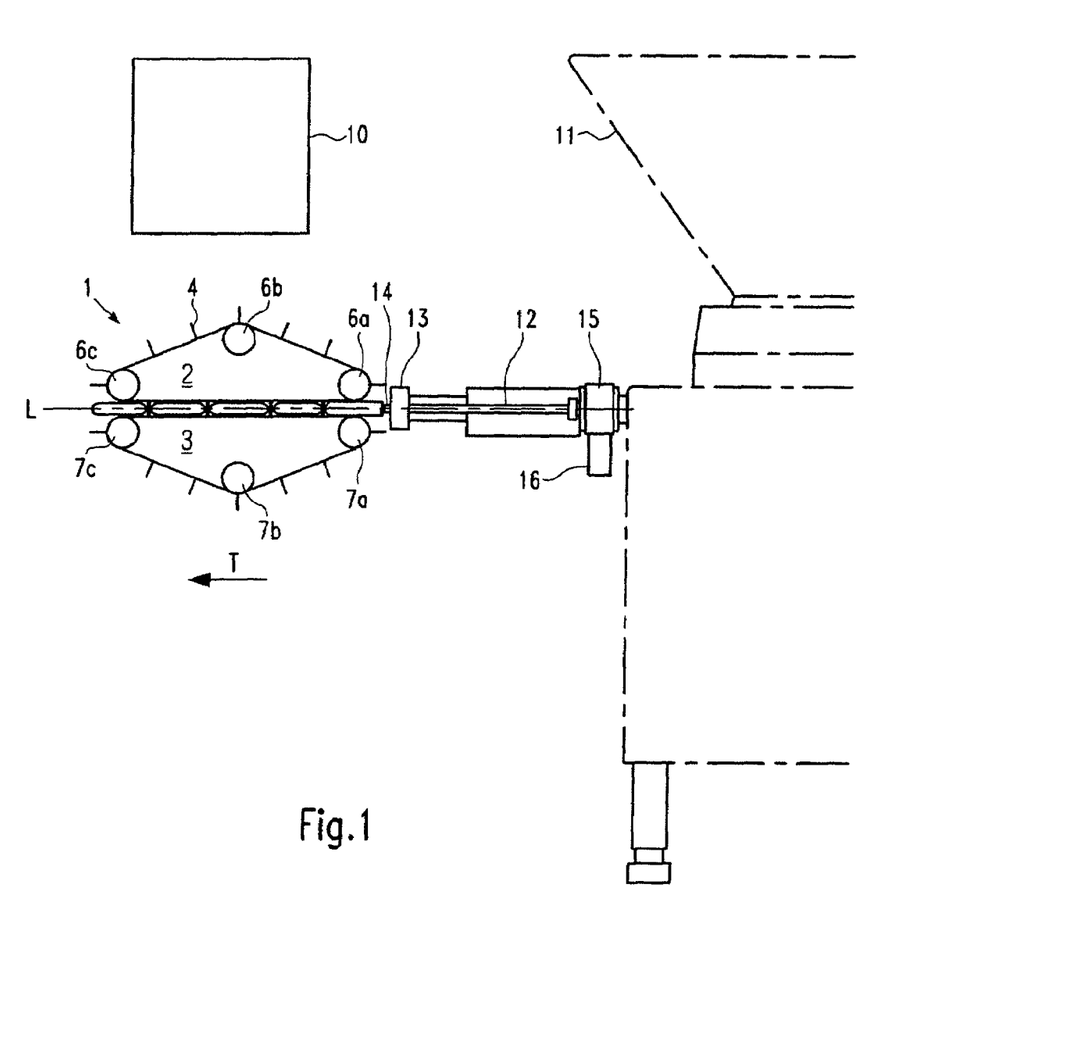
FIG. 1 shows a schematic lateral view of a stuffing machine provided with the apparatus according to the disclosure.

FIG. 1 schematically shows a stuffing machine for producing a stuffed sausage skein 14, which is subdivided into individual sausage skein portions of a predetermined length I by means of the apparatus 1 according to the disclosure. The stuffing machine comprises in a manner known per se a feeding hopper 11 via which a pasty mass, e.g. sausage meat, is filled in and pushed into a stuffing pipe 12 via a non-illustrated feeding mechanism. A casing brake 13 is provided an the end of the stuffing pipe. For twisting off the stuffed sausage skein a twist-off transmission 15 is optionally provided, which is driven by the motor 16. The twist-off transmission allows the stuffing pipe 12 together with the casing drawn onto the same to be rotated about the longitudinal axis L.

Via the stuffing pipe 12 the pasty mass is discharged into the casing, e.g. the intestine, which is fitted onto the stuffing pipe 12 and held by the casing brake 13, so as to produce the stuffed sausage skein 14 in a manner known per se.

Figure 2:
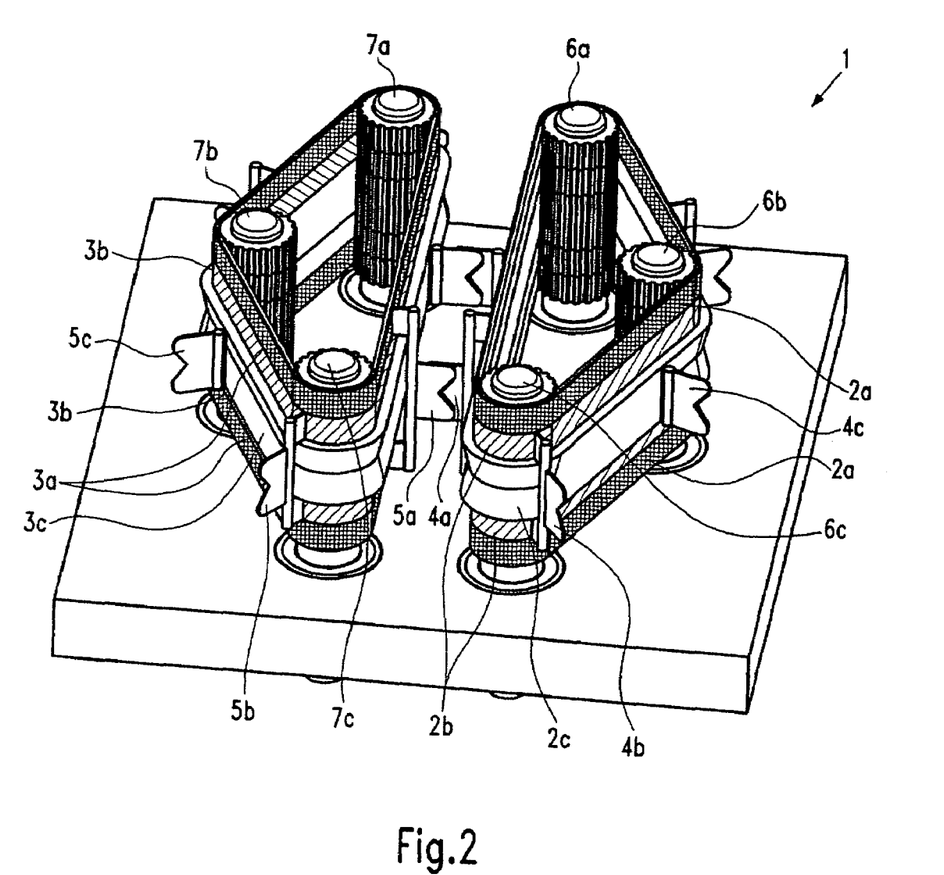
FIG. 2 shows a perspective view of an embodiment of the apparatus according to the disclosure for dividing a stuffed sausage skein.
Figure 3:
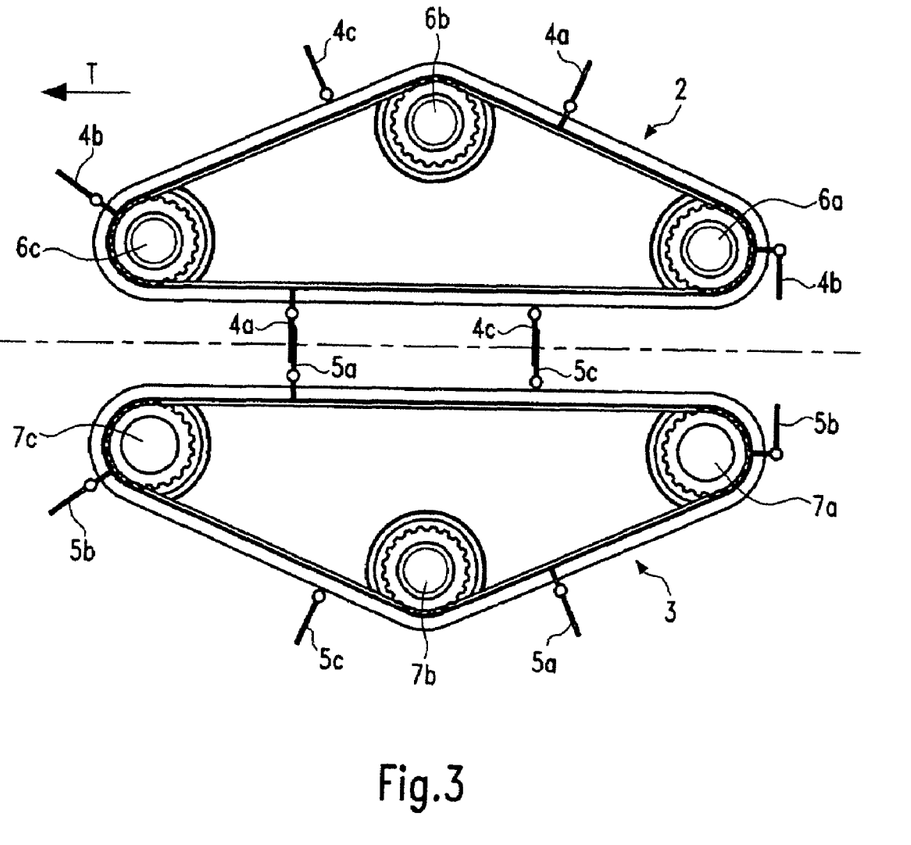
FIG. 3 schematically shows a lateral view of the embodiment illustrated in FIG. 2.

The apparatus 1 for dividing the stuffed sausage skein is located directly downstream of the stuffing pipe. The sausage skein is to be subdivided by the apparatus 1 into individual portions of a predetermined length I. FIGS. 2 and 3 show the disclosed apparatus according to a preferred embodiment. It can be seen in FIG. 3 that the apparatus comprises opposite transport elements 2, 3 arranged in pairs. For example, the opposite transport elements 2*a*, 3*a* and 2*b*, 3*b* and 2*c*, 3*c* represent three respective pairs of transport elements. The adjacently arranged transport elements 2*a, b, c* are arranged substantially symmetrically to the transport elements 3*a, b, c*, whereby the longitudinal axis L represents an axis of symmetry. The transport elements 2, 3 are configured to rotate, in this case as rotating belts, chains etc. The respective pairs of transport elements 2*a*, 3*a*; 2*b*, 3*b*; 2*c*, 3*c* can be driven independently of each other by corresponding drives 6*a, b, c*, 7*a, b, c*. This means that the opposite transport elements of a pair of transport elements 2*a*, 3*a*; 2*b*, 3*b*; 2*c*, 3*c* are driven synchronously, while the different pairs of transport elements can be driven at different speeds.

Drive 6*a* drives, for example, transport element 2*a*, drive 6*b* drives transport element 2*b* and drive 6*c* drives the central transport element 2*c*. At the same time, drive 7*a* drives the transport element 3*a*, drive 7*b* drives the transport element 3*b* and drive 7*c* drives the central transport element 3*c*. Drives 7*a*, 6*a* and drives 6*b*, 7*b* and drives 7*c*, 6*c* each run synchronously in pairs. The different drives are embodied such that only the region of a sleeve driven by a driving shaft is moving, said sleeve being in contact with the corresponding transport elements 2*a, b, c*, 3*a, b, c*. The driving axes of drives 6*a, b, c*, 7*a, b, c* are located substantially perpendicularly to the transport direction T or longitudinal axis L, respectively, of the apparatus. This means that the adjacently arranged transport elements are arranged adjacently with respect to the driving axis of drives 6*a, b, c*, 7*a, b, c*, that is, substantially perpendicularly to the transport direction T.

The transport elements of the transport element pairs 2*a*, 3*a*; 2*b*, 3*b*; 2*c*, 3*c* include corresponding dividing elements 4*a, b, c*, 5*a, b, c*. In the exemplary embodiment shown in FIGS. 2 and 3 three pairs of transport elements each having two pairs of dividing elements 4*a*, 5*a*; 4*b*, 5*b*; 4*c*, 5*c* are provided. It would also be possible to provide several pairs of dividing elements per pair of transport elements.

Figure 5:
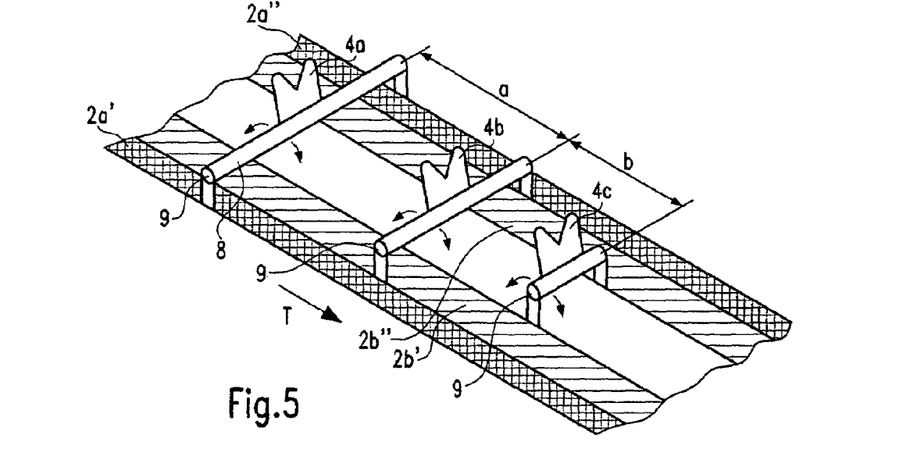
FIG. 5 shows a perspective view of a section of the adjacently arranged transport elements.
Figure 6:
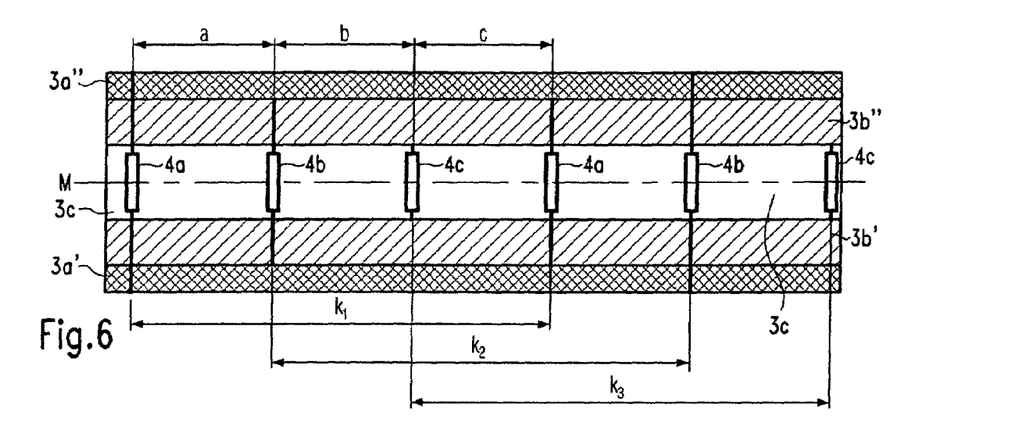
FIG. 6 shows a top view of the disassembled, adjacently arranged transport elements according to a preferred embodiment.
Figure 7:
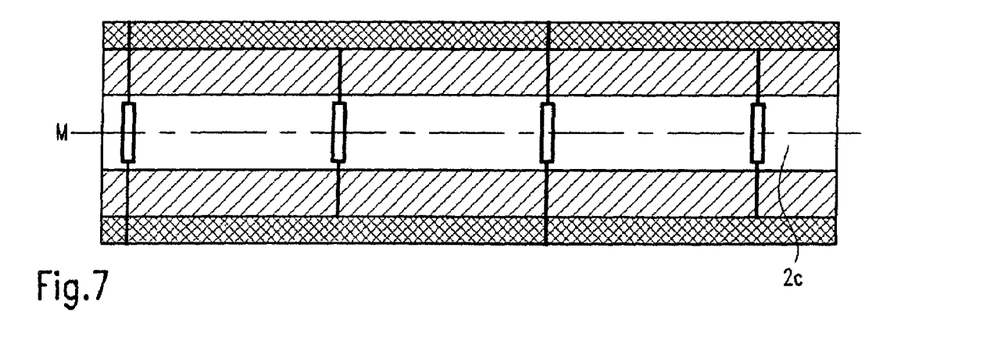
FIG. 7 shows a top view of the adjacently arranged transport elements according to another preferred embodiment.
Figure 8:
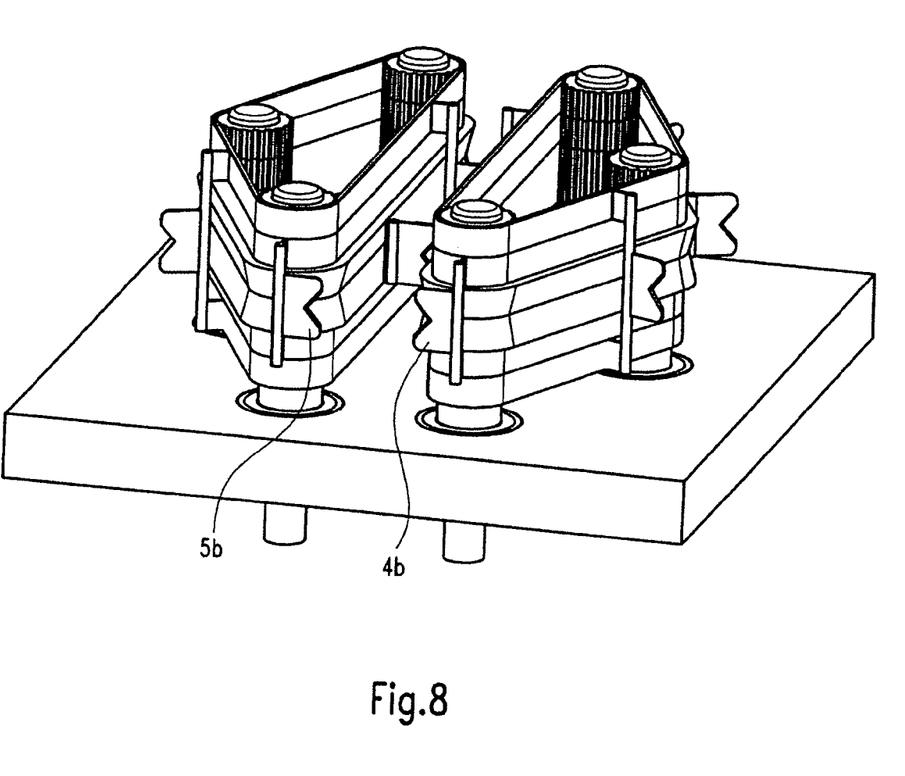
FIG. 8 shows a perspective view of another embodiment of the present disclosure.

As can be seen even better in connection with FIG. 6 to 7 a pair of transport elements in this embodiment is formed of several spaced-apart subtransport element pairs 2*a'*, *a''*, 3*a'*, *a''*, 2*b'*, *b''*, 3*b'*, *b''*. As can be seen in FIG. 5, the outer cross-hatched subtransport elements 2*a'*, 2*a''* form the transport element 2*a*, which is driven by the drive 6*a*, whereby the subtransport elements 2*a'*, 2*a''* are driven at the same speed. Within the subtransport elements 2*a'*, 2*a''* the subtransport elements 2*b'*, 2*b''* as illustrated by dashed lines are arranged. The transport element 2*c*, which is not subdivided, is disposed in the center. The subtransport elements 2*a'*, 2*a''* and 2*b'*, 2*b''* are each connected to each other by an arch of a connecting element 8, whereby the dividing elements 4*a* and 4*b*, respectively, are disposed on the corresponding arch 8. Dividing element 4*c* is disposed directly on the transport element 2*c*. Dividing elements 4*a, b, c* are disposed such that they come to lie substantially over the central axis M of the adjacent transport elements so as to ensure that the stuffed sausage skein 14 is divided correctly. As can be recognized in FIG. 5, the dividing elements 4*a, b, c* are preferably mounted to be rotatable about an axis which is parallel to the driving axis of the transport elements. To this end, the bearing 9 is provided. By this, it is possible to engage the dividing elements 4*a, b, c* orthogonally to the stuffing material skein to produce, for example, shaped ends (without twisting off). The dividing elements are guided orthogonally to the stuffed skein or brought into this position, respectively, by a guide which is not explained and illustrated in more detail.

The dividing elements 4*a, b, c* may have different shapes, e.g. straight plates, V-shaped, etc.

In connection with FIG. 5 only one half of the transport element pair was described, but it will be appreciated that the opposite transport elements of the pairs of transport elements are constructed correspondingly.

FIG. 6 shows a top view onto the disassembled, adjacently arranged transport elements 3*a, b, c* which are constructed in accordance with the explanation in connection with FIG. 5. As is illustrated in FIG. 6, each transport element 3*a, b, c* has two dividing elements 4*a*, 4*b*, 4*c*. The dividing elements 4 of the same transport elements have a predetermined spacing K1, K2 or K3 from each other, so that the closed transport element, that is, the closed belt, has a specific pitch. In the state illustrated in FIG. 6 the dividing element 4*a* has a spacing a from the dividing element 4*b*. The dividing element 4*b* has a spacing b from dividing element 4*c*, and the dividing element 4*c* has a spacing c from dividing element 4*a* etc. These spacings are variable. They can be varied by varying the speed at which the dividing elements are driven by the corresponding transport elements. As can be seen in FIG. 5, for example, spacing b is smaller than spacing a.

By means of the control device 10 shown in FIG. 1 the speed of the individual transport element pairs can be controlled via the corresponding drives 6, 7 such that the sausage skein sections or portions, respectively, divided by successive dividing element pairs 4*a*, 5*a*, 4*b*, 5*b*, 4*c*, 5*c*, which engage the sausage skein 14, have a predetermined length L. The dividing elements are unable to overtake each other.

The apparatus according to the disclosure operates as follows. As was described above, a stuffed sausage skein 14 is produced by the stuffing machine shown in FIG. 1 and is passed through the adjacently arranged transport element pairs 2*a*, 3*a*; 2*b*, 3*b*; 2*c*, 3*c*. The transport elements of a respective transport element pair are driven synchronously and are aligned such that the corresponding dividing elements of the dividing element pairs 4*a*, 5*a*; 4*b*, 5*b*; 4*c*, 5*c* are oriented to one another in pairs and are arranged substantially opposite each other allowing them, when they engage the sausage skein, to produce a point of separation S. Then, as can be seen, for example, in FIG. 4*a*, the stuffed sausage skein 14 is divided at a first point S1 by the dividing element pair 4*c*, 5*c* which engages the sausage skein. During the engagement of the dividing elements, the pasty mass in the sausage skein is displaced at this point, which results in a point of separation. The dividing elements 4, 5 may thereby engage each other or slide past each other, as is generally known. The dividing elements 4*c*, 5*c* are disposed on the transport element pair 2*c*, 3*c*. When engaging the sausage skein, the dividing element pair 4*c*, 5*c* is driven by the controller 10 synchronously with respect to the stuffing material discharge, i.e. to the discharge speed of the pasty mass out of the stuffing pipe or, respectively, to the transport speed of the stuffed sausage skein 14. The stuffed sausage skein 14 is conveyed further in the transport direction T by the movement of the engaging dividing elements 4*c*, 5*c*.

Figure 4A:
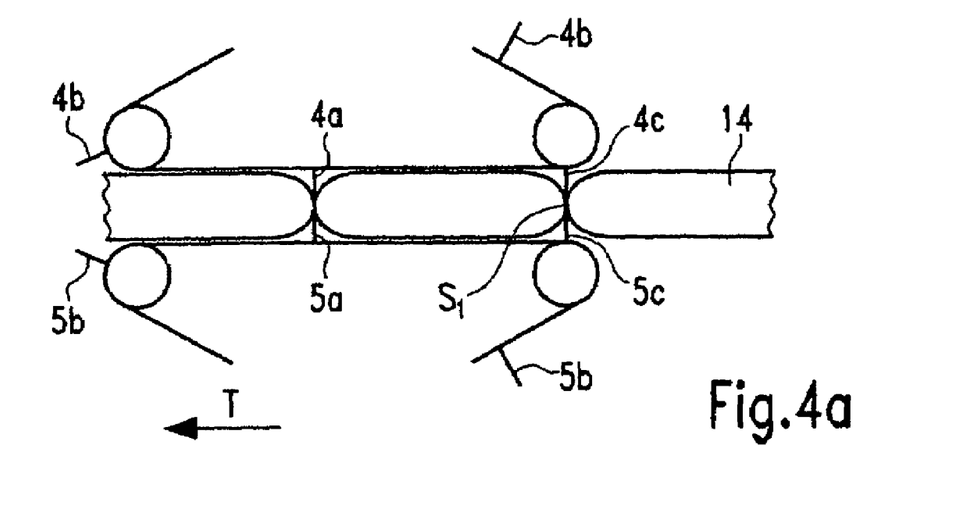
FIGS. 4a and 4b show a section of the apparatus according to the disclosure during the dividing process.

As can be recognized in FIG. 4*a*, the dividing element pair 4*c*, 5*c*, which is in engagement with the sausage skein 14, is followed by the dividing element pair 4*b*, 5*b* disposed on the transport element pair 2*b*, 3*b*. This successor pair of dividing elements moves at a corresponding speed controlled by the control device 10 in the direction toward the next point of separation S2 to be produced and may be engaged, possibly after a short waiting period, in the desired moment so as to produce the second point of separation S2 and, thus, a portion having the length I. In the example shown in FIGS. 4a and 4b the transport element pair 2b, 3b can move at a speed different from the transport speed of the stuffed sausage skein, as none of the dividing element pairs disposed on this transport element pair is in engagement with the sausage skein 14. By means of the control device 10 the speed of the transport element pairs 2a, 3a; 2b, 3b; 2c, 3c can, thus, be adjusted such that the spacing between the first S1 and the second point S2 corresponds to a predetermined length L of the divided sausage skein. The controller 10 calculates on the basis of the length and the circumference, respectively, of the rotating transport elements and the corresponding pitch which speed a respective transport element must have to produce a specific point of separation.

Figure 4B:
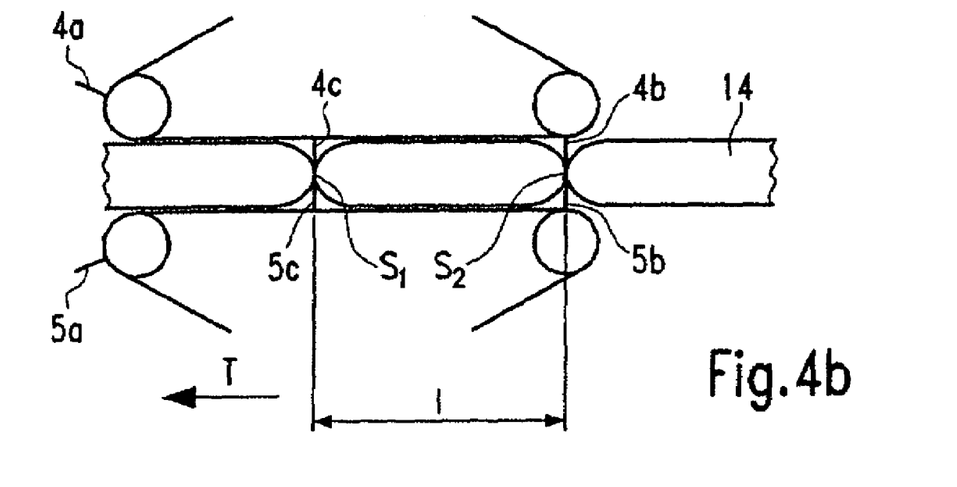

The process shown in connection with FIGS. 4a and b is repeated continuously.

Figure 10:
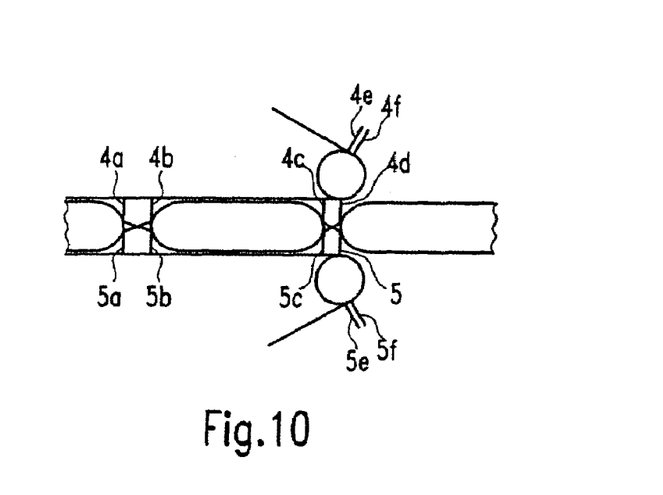
FIG. 10 roughly shows in a perspective view the production of a point of separation with two pairs of dividing elements mounted one behind the other.

As can be seen in FIG. 10 the point of separation S1, S2 can, according to a preferred embodiment, be produced such that two pairs of dividing elements 4, 5 are engaged in the skein 14 to be divided one directly behind the other. Thus, a wider point of separation is produced. This effect is intensified if the two pairs 4, 5 move at different speeds during their engagement, that is, if the second pair runs more slowly than the first pair. To this end, the two dividing element pairs running one behind the other, e.g. 4a, 5a, 4b, 5b, have to be arranged on different transport element pairs. Thus, the spacing between the dividing element pairs can be varied. Two successive displacer pairs, here 4c, 5c; 4d, 5d and 4e, 5e, 4f, 5f, respectively, should, again, be arranged on different transport elements so as to allow different sequences of motions. Thus, there is the possibility to produce an even greater gap between the portions. This is advantageous in a closing process performed, for example, with two adjacently placed clips.

FIG. 7 shows a preferred embodiment of the present disclosure. In this embodiment an independently drivable transport element 2c is provided, which has no dividing elements and is embodied to guide and support the stuffed sausage skein 14. This transport element pair 2c, 3c is driven by the control device 10 to run synchronously with respect to the stuffing material discharge and the transport speed of the stuffed sausage skein 14, respectively. The surface of this transport element pair and the spacing thereof, respectively, is designed to support and guide the sausage skein 14. This transport element pair in the middle can then also cover greater distances than the other transport elements equipped with dividing elements 4, 5. This system is particularly suited for the production of twisted off portions, that is, if—as illustrated in FIG. 1—a twist-off transmission 15 and a brake ring 13 are provided. The sausage skein 14 is then discharged at a constant speed and is held by the transport element pair 2c, 3c and is subjected to torsional prestress. By the engagement of the dividing elements, then the twist-off point is defined.

Figure 9:
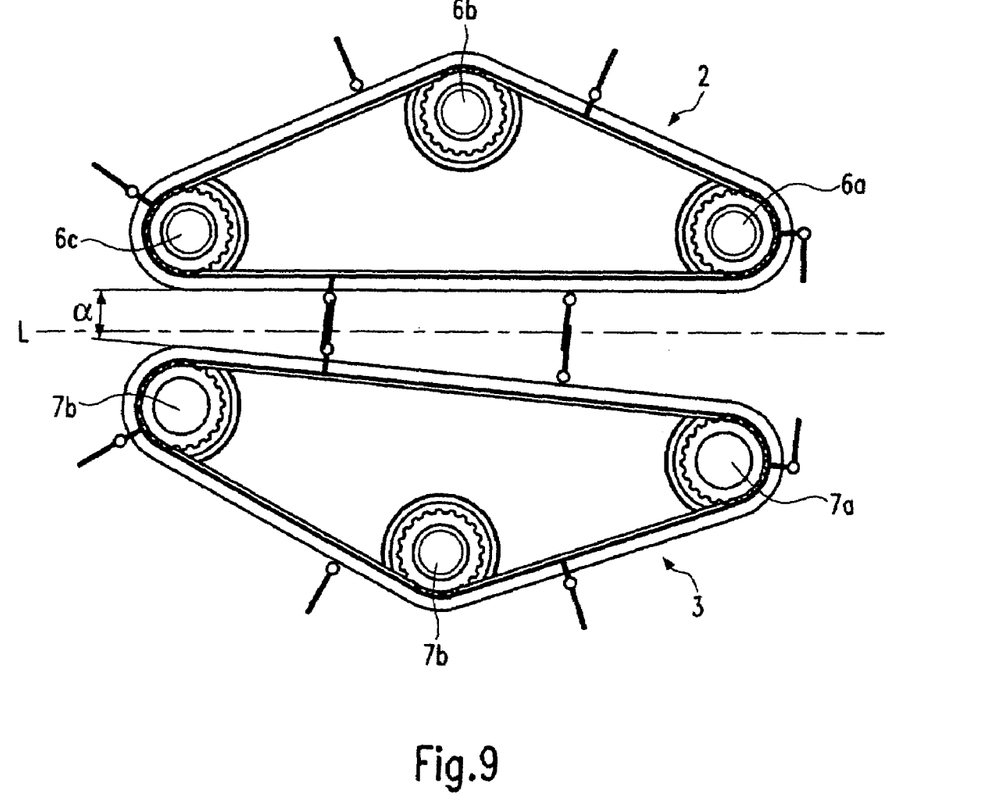
FIG. 9 shows a lateral view of another preferred embodiment of the present disclosure.

As can be seen in FIG. 9, it is also possible according to another embodiment of the present disclosure that the rotating transport elements of the transport element pairs are not located opposite each other in parallel, but approach each other under a specific angle α in the transport direction T. By this, the dividing elements of the dividing element pairs can be engaged slowly, so that the point of separation is produced softly.

Figure 11:
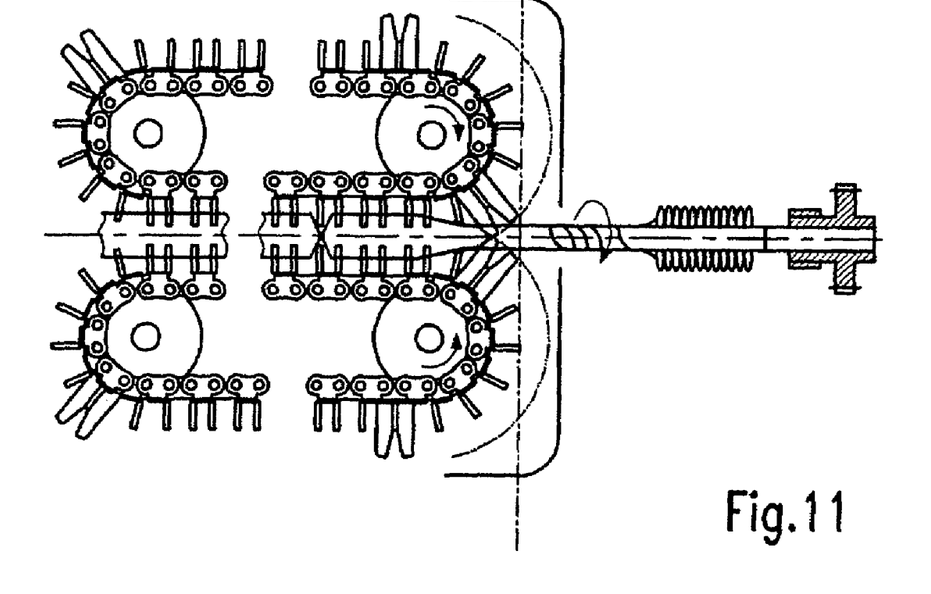
FIG. 11 shows an apparatus for dividing a stuffed sausage skein according to the prior art.
Figure 12:
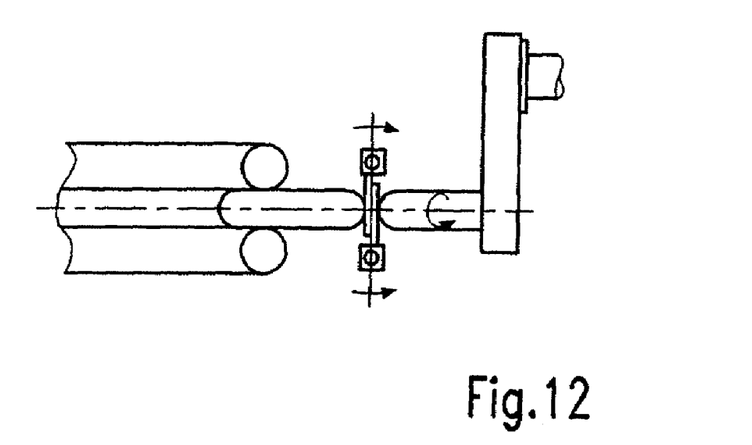
FIG. 12 shows an apparatus for dividing a stuffed sausage skein according to the prior art.

FIG. 11 shows one type of prior art device, as discussed above in the Background section relative to U.S. Pat. No. 6,050,888, while FIG. 12 shows another type prior art device, as also discussed above in the Background section but relative to EP 0472825.

The invention claimed is:

1. Apparatus (1) for dividing a stuffed sausage skein (14), comprising:
a transport element pair (2, 3) including rotating opposite transport elements between which the stuffed sausage skein (14) is conveyed in transport direction T and each of the transport element pair (2, 3) include at least one dividing element (4, 5), and wherein several adjacently arranged transport element pairs (2a, 3a; 2b, 3b; 2c, 3c) are drivable independently of each other with corresponding dividing element pairs (4a, 5a; 4b, 5b; 4c, 5c).

2. Apparatus according to claim 1, and an independently drivable transport element pair (2c, 3c) which has no dividing elements and is constructed to guide and support the stuffed sausage skein, and a control device (10) driving said transport element pair (2c, 3c) at a speed to run synchronously with respect to the stuffing material discharge and the transport speed of the stuffed sausage skein, respectively.

3. Apparatus according to claim 1, and wherein at least one transport element pair (2a, 3a; 2b, 3b) is formed of several spaced-apart subtransport element pairs (2a', a", 3a', a", 2b', b", 3b'b") driven in the same manner.

4. Apparatus according to claim 3, wherein the transport elements (2a', a", 3a', a", 2b', b", 3b 'b"), which are disposed side by side in a spaced-apart manner, are connected by a connecting element (8) of the transport element pairs on which the dividing element (4a, 5a; 4b, 5b) is arranged.

5. Apparatus according to claim 1, wherein the dividing elements (4a, 5a; 4b, 5b; 4c, 5c) are arranged to lie substantially above the central axis M of the adjacent transport elements.

6. Apparatus according to claim 1, wherein the dividing elements (4a, 5a; 4b, 5b; 4c, 5c) are disposed on the transport elements to be rotatably mounted about an axis perpendicularly to the transport direction T.

7. Apparatus according to claim 1, and a control device (10) is provided, which controls the independent drives of the transport element pairs (2a, 3a; 2b, 3b; 2c, 3c) such that the sausage skein portions separated by successive pairs of dividing elements (4a, 5a; 4b, 5b; 4c, 5c), which engage the sausage skein, have a predetermined length L.

8. Apparatus according to claim 1, wherein the rotating transport elements of the transport element pairs (2a, 3a; 2b, 3b; 2c, 3c) are disposed opposite largely in parallel to each other or approach each other under a specific angle (a) in the transport direction T.

9. Method for dividing a stuffed sausage skein with an apparatus according to claim 1, comprising the following steps:
a; transporting the stuffed sausage skein (14) in the transport direction T through the adjacently arranged rotating transport element pairs (2a, 3a; 2b, 3b; 2c, 3c),
b; dividing the stuffed sausage skein (14) at a first point S1 by a dividing element pair (4a, 5a; 4b, 5b; 4c, 5c) of one of the transport element pairs (2a, 3a; 2b, 3b; 2c, 3c), which engages the sausage skein,
c; transporting the stuffed sausage skein (14) further,
d; dividing the stuffed sausage skein at a second point S2 by a following dividing element pair (4a, 5a; 4b, 5b; 4c, 5c) of another transport element pair (2a, 3a; 2b, 3b; 2c, 3c), which engages the sausage skein,
wherein the speeds of the transport element pairs (2a, 3a; 2b, 3b; 2c, 3c) is adjusted such that the spacing between the first S1 and the second point S2 corresponds to a predetermined length I of the divided sausage skein (14).

10. Method according to claim 9, wherein, as the pair of dividing elements engages the sausage skein, the corresponding pair of transport elements is driven at a speed synchronous with respect to the discharge of the stuffing material and the conveying speed of the stuffed sausage skein, respectively.

11. Method according to claim 9 wherein for producing the points of separation, in steps a) and d) two dividing element pairs (4*a*, 5*a*; 4*b*, 5*b*; 4*c*, 5*c*) are each engaged directly one after the other with the stuffed sausage skein to be separated.

12. Method according to claim 11, wherein the two dividing element pairs (4*a*, 5*a*; 4*b*, 5*b*; 4*c*, 5*c*) are disposed on different transport element pairs (2*a*, 3*a*; 2*b*, 3*b*; 2*c*, 3*c*), wherein the transport element pair including the second dividing element pair is driven more slowly than the first one.

\* \* \* \* \*

UNITED STATES PATENT AND TRADEMARK OFFICE
CERTIFICATE OF CORRECTION

PATENT NO.        : 7,381,123 B2
APPLICATION NO.   : 11/901617
DATED             : June 3, 2008
INVENTOR(S)       : Manfred Bachtle It is certified that error appears in the above-identified patent and that said Letters Patent is hereby corrected as shown below:

Title page, item (30) should read as follows:

European Patent Application No.: 06 019 555.9

Filed: September 19, 2006.

Signed and Sealed this

Twelfth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,381,123 B2 Page 1 of 1
APPLICATION NO. : 11/901617
DATED : June 3, 2008
INVENTOR(S) : Manfred Bachtle It is certified that error appears in the above-identified patent and that said Letters Patent is hereby corrected as shown below:

In the Claims:

At Column 8, line 47, "(a)" should be -- ($\alpha$) --.

Signed and Sealed this

Seventh Day of October, 2008

JON W. DUDAS
*Director of the United States Patent and Trademark Office*